(No Model.)

E. C. WARREN.
GAS STOVE.

No. 485,852. Patented Nov. 8, 1892.

Witnesses:
J. Kannmacher
C. L. Miller.

Inventor:
Edric C. Warren
By A. O. Behel
Atty.

UNITED STATES PATENT OFFICE.

EDRIC C. WARREN, OF ROCKFORD, ILLINOIS, ASSIGNOR OF ONE-HALF TO GEORGE D. ROPER, OF SAME PLACE.

GAS-STOVE.

SPECIFICATION forming part of Letters Patent No. 485,852, dated November 8, 1892.

Application filed October 9, 1891. Serial No. 408,259. (No model.)

*To all whom it may concern:*

Be it known that I, EDRIC C. WARREN, a citizen of the United States, residing at Rockford, county of Winnebago, and State of Illinois, have invented certain new and useful Improvements in Gas-Stoves, of which the following is a specification.

The object of this invention is to expedite the heating of the oven of a gas-stove by producing a circulation of heated air through it and by certain modifications in the extent and course of the current to apply the greater heat of the burner at either the bottom or the top of the oven, as the nature of the food to be baked requires, and, further, to utilize a great portion of the heat of the gases from the blaze without permitting them to come in contact with the cooking food.

Figure 1:
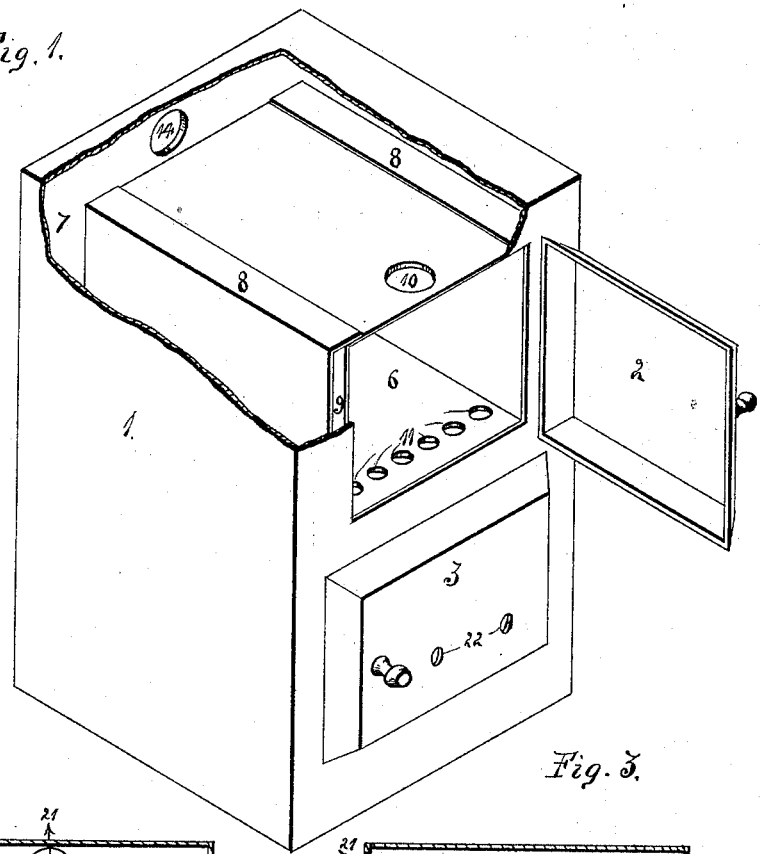
Figure 2:
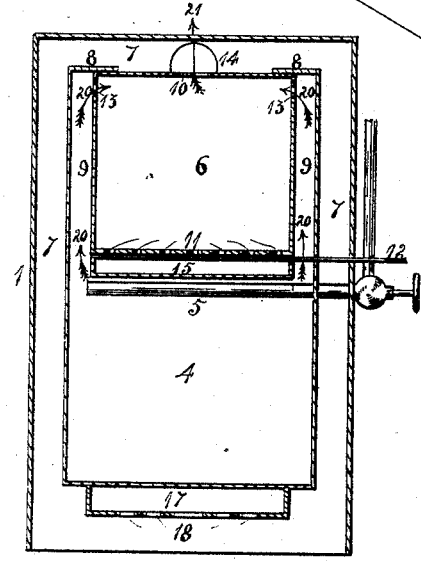
Figure 3:
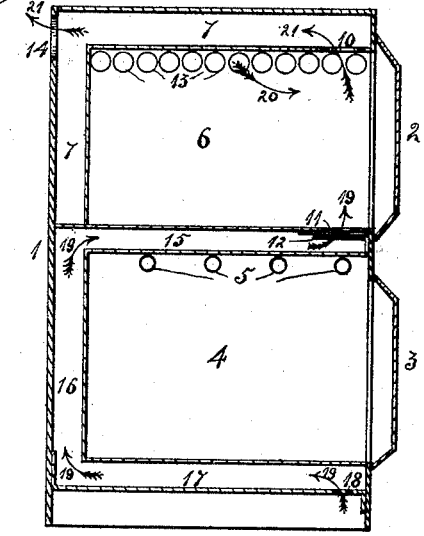

In the drawings, Figure 1 is an isometrical representation of a gas-stove embodying my invention with portions of the outer casing cut away. Fig. 2 is a transverse vertical section through the openings 10, 11, and 18. Fig. 3 is a lengthwise vertical central section of my stove.

In the construction of my stove I employ the usual outer casing 1, to which are hinged the upper door 2 and the lower door 3. This latter door opens into the lower part of what is commonly known as the "roaster" or "roasting-oven" 4, in which just above the upper edge of the door are located the gas-burners 5, while the upper door 2 gives access to the upper and smaller or baking oven 6, which is located within and secured to the upper side of the oven 4. The roasting oven 4 is of such dimensions that a space 7 is left between its side, rear, and top walls and the outer casing, within which it is firmly supported. The top of the oven 4 is made up in part of the upper wall of the smaller oven 6, the sides of the oven 4 turning inward in the flanges 8 and the oven 6 being riveted thereto. The baking-oven 6 I make somewhat narrower than the large oven 4, so when the former is secured in position there will remain air-space 9 at its sides and between its walls and those of the larger oven, the height of the former being about one-half that of the oven 4, within which it is secured. In the forward central part of the top of the oven 6 I provide the hole 10, and directly below this in the bottom the series of holes 11, which latter are opened or closed by the damper-slide 12, operated by a handle extending through the outer casing at the side of the stove. Near the upper part of the sides of this oven are the two series of holes 13, communicating between the air-space 9 and the oven 6, and through the upper part of the rear wall of the outer casing I cut the hole 14, forming the outlet or chimney for the heated air and the products of combustion from the burners. The openings 11 in the bottom of the oven 6 communicate with an air-space 15, lying between the oven-bottom and the burners 5 and having communication with the outer air through the diving-flue 16 and base-flue 17, extending back of and below the roasting-oven 4, opening in the series of holes 18 underneath the stove. The burner 5 may be of any suitable pattern and requires no detailed description here.

In the drawings I designated the direction of the different currents of air by the arrows 19, 20, and 21, and the last being a union of the two former, which takes place in the upper part of the oven 6, from whence it passes in that current to the open air.

In gas-stoves as heretofore built the heating of the oven after lighting gas has been a slow and tedious process. Those chambers being closed tightly receive their heat only by the conduction of the metal of which they are made. In my stove, on the contrary, I am enabled by opening the apertures 11 in the bottom of the baking-oven to introduce a current of heated air directly into and through the oven, rendering it sufficiently hot to bake in a comparatively-short time. This current of air (indicated by the arrows 19) is drawn from the outer air through the openings 18 under the stove, and is thus pure and clean. Entering through these apertures into the base-flue 17 and through the diving-flue 16, the air passes to the chamber 15 over the burners, where it is heated, and rises through the oven 6 and in the course indicated by the arrows 21 to the outer air. The air necessary to sustain combustion is admitted through apertures 22 through the door 3 and, rising from the burners in the arrows 20 at the sides of the oven 6 until arising at the holes 13, it passes into the oven above the food and joins the outgoing current. (Indicated by arrows 21.)

A further objection to gas-stoves of the common style is that they do not maintain a moderate or even heat in the oven; but, on the contrary, the bottom becomes hot and the upper portion remains much cooler, greatly detrimental to the baking of certain articles of food where the heat should be even or perhaps more intense at the top. To overcome these objections and to obtain perfect control over the oven, the manufacturers of gas-stoves have experimented largely, but heretofore without complete success.

To attain the desideration above outlined, I close the apertures 11 in the baking-oven bottom by means of the slide 12, creating a dead-air space below the oven 6, tempering the heat of the blaze and producing an even temperature within the oven.

I claim as my invention—

1. A gas-stove comprising a lower oven and an upper oven, a burner within the lower oven, an air-space between the ovens, said air-space closed to the products of combustion, an air-supply for said air-space, the ingress of the air-supply being at a point lower than the burners, openings in the bottom of the upper oven, communicating with the air-space, an exit for the air from the upper oven, the air-supply and the openings in the bottom of the upper oven being so relatively located as to produce a circulation of air through the air-space, and a damper for regulating the size of the openings in the bottom of the upper oven.

2. A gas-stove comprising a burner, an oven over the burner, an air-space between the oven and the burner, the air-space closed to the products of combustion, openings from the air-space into the oven, and an ascending flue and a base-flue connecting the air-space with the outer air.

3. A gas-stove comprising a burner, an oven over the burner, an air-space between the oven and the burner, the air-space closed to the products of combustion, openings from the air-space into the oven, a base-flue and an ascending flue connecting the air-space with the open air, and an escape in the upper portion of the oven for the heated air.

4. A gas stove comprising a burner, an oven over the burner, an air-space between the oven and the burner, the air-space closed to the products of combustion, openings from the air-space into the oven, a damper for closing the openings, a base-flue and an ascending flue connecting the air-space with the outer air, ascending flues at the rear and the sides of the oven, an escape-flue over the top of the oven, and a communication between this latter flue and the upper part of the oven.

5. A gas-stove comprising a lower oven and an upper oven, a burner within the lower oven, an air-space between the ovens, said air-space closed to the products of combustion, an air-supply for said air-space, the ingress of the air-supply being at a point lower than the burners, openings in the bottom of the upper oven, communicating with the air-space, and an exit for the air from the upper oven, the air-supply and the openings in the bottom of the upper oven being so relatively located as to produce a circulation of air through the air-space.

6. A gas-stove comprising an upper oven and a lower oven, a burner in the lower oven, an air-space between the ovens, a vertical inlet-flue for the air-space at the rear of the lower oven, openings in the bottom of the upper oven near its front, communicating with the air-space, and an opening in the top thereof for the escape of air.

EDRIC C. WARREN.

Witnesses:
A. O. BEHEL,
L. L. MILLER.